United States Patent [19]

Polillo et al.

[11] 4,208,549

[45] Jun. 17, 1980

[54] COIN SURVEILLANCE APPARATUS

[76] Inventors: William M. Polillo, 1003 N. Broad, Galesburg, Ill. 61401; Martin L. Bray, 437 E. Coal, Wataga, Ill. 61488; Richard W. Reno, 336 N. Cedar, Galesburg, Ill. 61401; Albert J. La Mere, 7827 Hohman Ave., Munster, Ind. 46321

[21] Appl. No.: 920,451

[22] Filed: Jun. 29, 1978

[51] Int. Cl.² .......................................... H04M 17/00
[52] U.S. Cl. .................................... 179/6.3 R; 179/6.4
[58] Field of Search ................. 179/6.3 R, 6.4, 6.5; 194/1 M, 1 N; 340/505; 235/92 CN

[56] References Cited

U.S. PATENT DOCUMENTS

| | | | |
|---|---|---|---|
| 3,112,366 | 11/1963 | Gibbs | 179/6.4 |
| 3,492,428 | 1/1970 | Hays et al. | 179/6.4 |
| 4,039,768 | 8/1977 | O'Maley | 179/6.3 R |
| 4,041,243 | 8/1977 | Zarouni | 179/6.5 |
| 4,123,623 | 10/1978 | McElliott | 179/6.3 R |
| 4,124,774 | 11/1978 | Zarouni | 179/6.3 R |
| 4,124,775 | 11/1978 | Zarouni | 179/6.3 R |

FOREIGN PATENT DOCUMENTS

| | | | |
|---|---|---|---|
| 2132057 | 6/1971 | Fed. Rep. of Germany | 179/6.3 R |
| 1072575 | 6/1967 | United Kingdom | 179/6.3 R |

*Primary Examiner*—Gerald Brigance

[57] ABSTRACT

This invention relates to a coin surveillance apparatus that will monitor the amount of money deposited in a pay telephone, vending machine or the like. The apparatus is comprised of two basic units, the first being a monitoring unit positioned within the phone or machine for monitoring the amount of coins deposited therein; the second unit being a polling and display unit for receiving information from the first unit as to the number of nickels, dimes and quarters deposited in the machine. The second unit has means to initiate a command to the monitoring unit for a reading and/or for recording and displaying the information when received.

17 Claims, 9 Drawing Figures

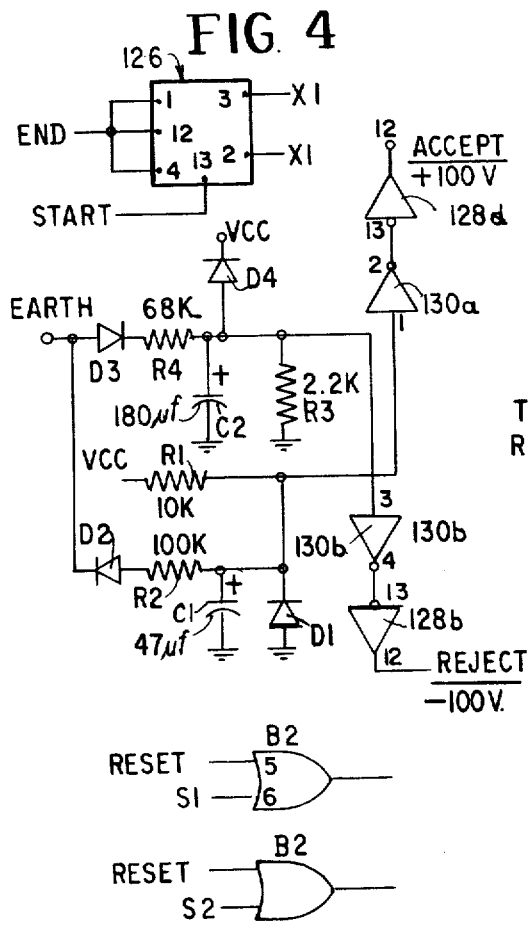
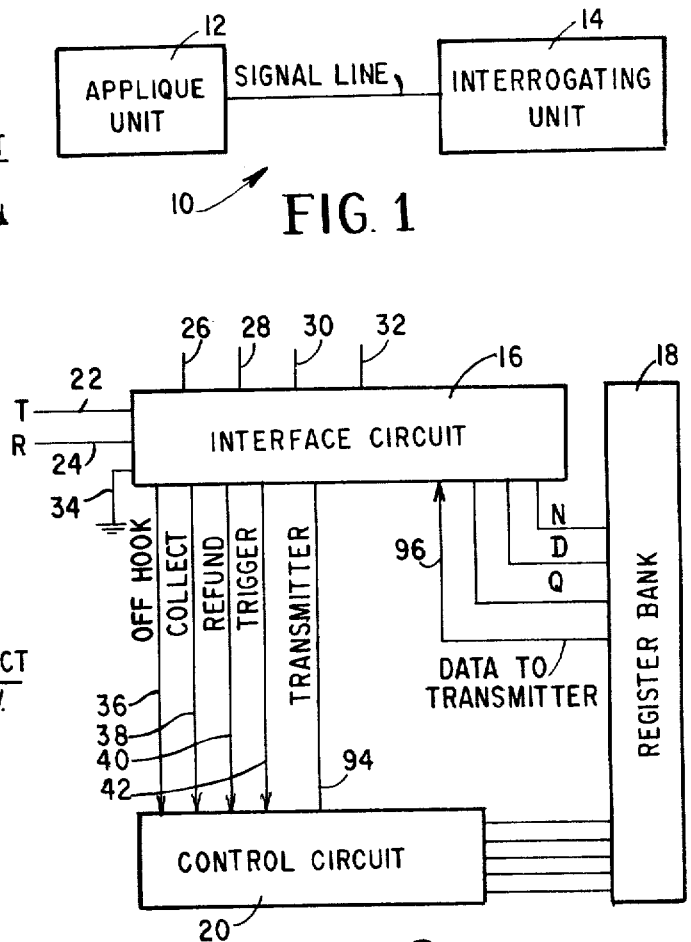
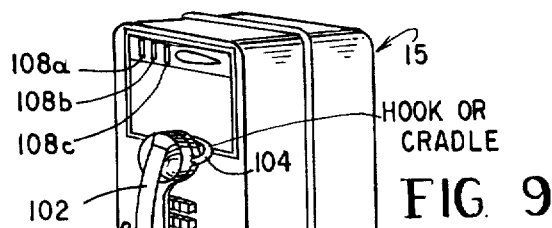
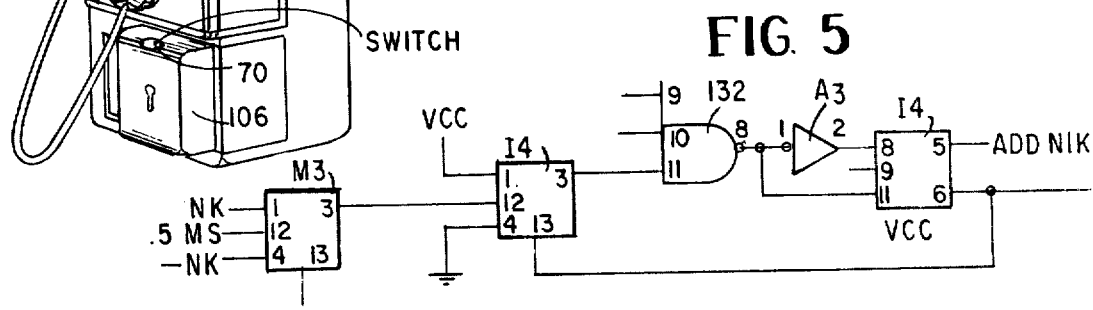
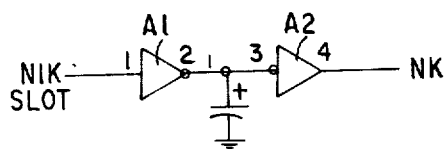

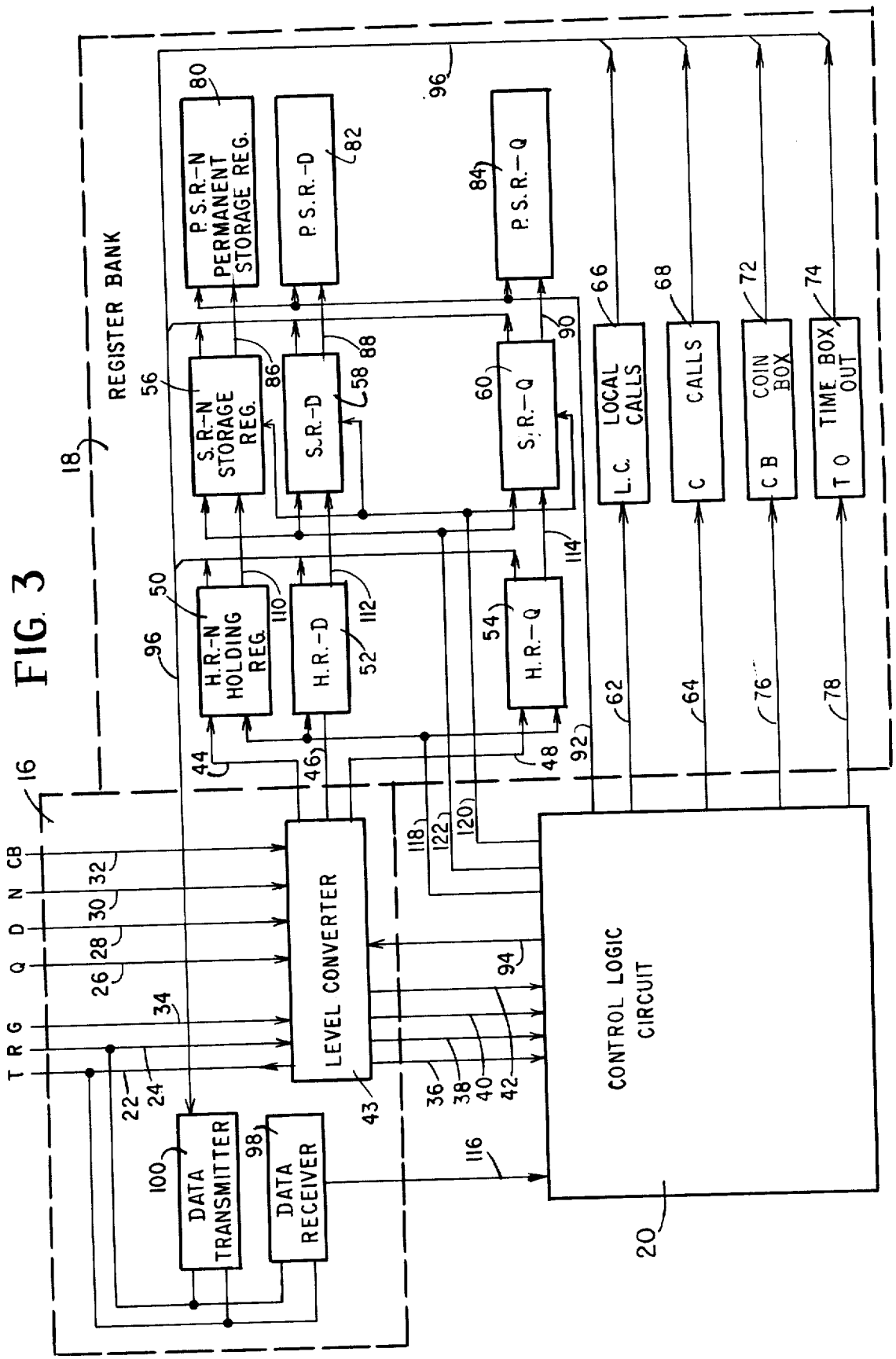

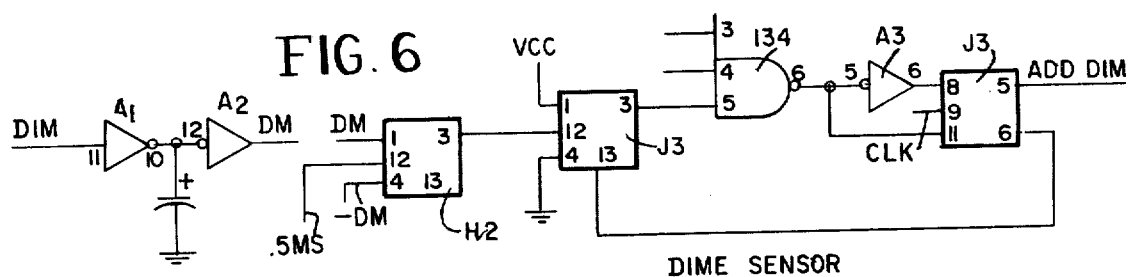
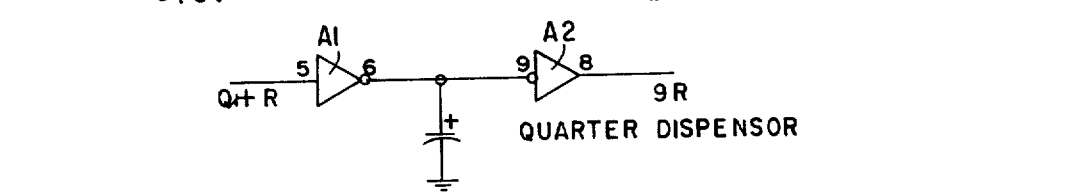
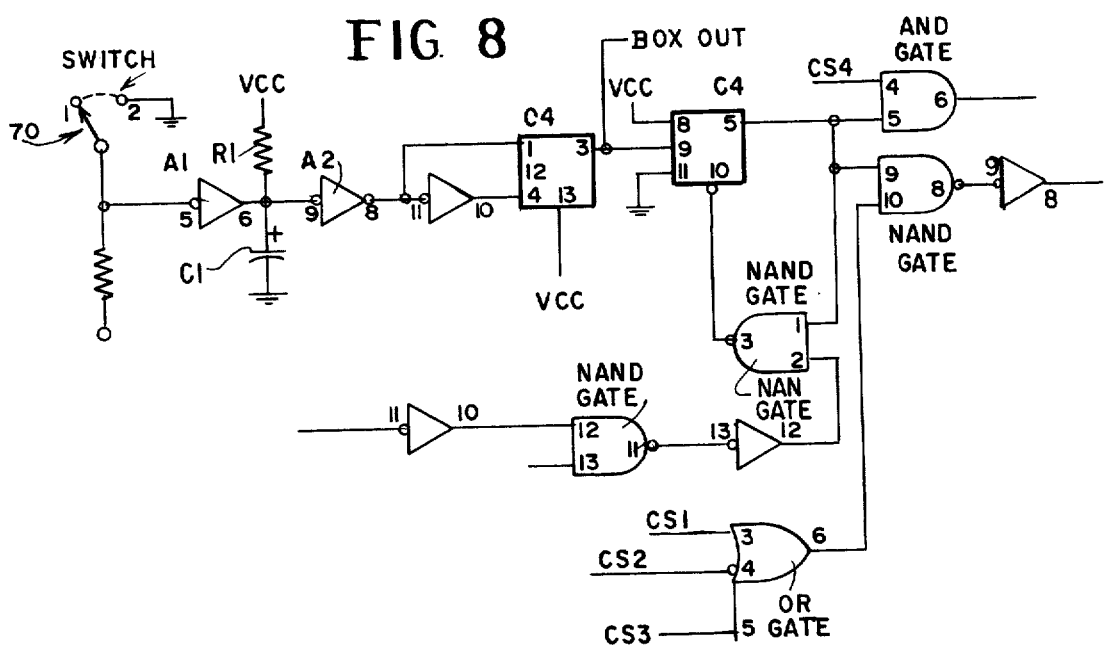

COIN SURVEILLANCE APPARATUS

BACKGROUND OF INVENTION

There are many industries that rely upon a periodic pickup of coins from their machines, in particular, the telephone and vending machine industries. The most efficient means to collect coins from phones and/or vending machines is to have the collection made when the coin box is full or almost full; thereby reducing the number of times a person empties the box. Naturally, the less times the box is required to be emptied results in a savings of man hours and hence a savings in money which can be translated into greater profits. Today, coin box pickups are scheduled depending upon the use of the particular machine, but in most cases are made when the coin box is half or less than half empty. This, as stated before, results in a wasted trip, lost labor, less profit. Industries have tried various systems for optimizing coin box collections. One of such systems is to schedule pickups based upon prior history. However, this is unreliable because it cannot take into account the day to day fluctuations in usage. A regular schedule of coin box pickups is also dangerous in that it makes the collector more susceptible to attack and theft of collected funds.

A device for optimizing the pickup of money from coin boxes would reduce labor, increase profits and reduce the danger of theft from the collector. Our device enables a person to monitor every apparatus they have from which they are responsible for picking up the proceeds from the coin boxes of said apparatuses. The monitoring of each machine or apparatus at a central office enables a person to know how much is in each coin box at any moment in time, thereby allowing one to schedule a pickup of all machines where coin boxes are substantially full. Our invention incorporates electronic means to monitor each machine or apparatus in a system, and upon command from a receiving unit cause information to be transmitted to a receiving unit for storage and/or display. The information transmitted will enable a person at a central office to determine the status of each coin box of each machine of the system being monitored.

I am not aware of any apparatus or other means that can efficiently and effectively enable a person in a central office to monitor the amount of coins in each coin box of a plurality of machines or devices in a particular system thereby enabling one to optimize the scheduling for picking up the coins of those machines whose coin boxes are substantially full. The existing methods for scheduling the collection of coins from coin box machines are inefficient, time consuming and expensive. My system for electronically monitoring the state of each coin box of each machine in a system results in the collecting of the coins from the coin box when they are substantially full, resulting in a reduction of labor for collection of almost empty boxes, thus resulting in less labor expense and hence increased profits.

SUMMARY OF INVENTION

This invention relates to a new and useful coin surveillance apparatus that will provide a central monitoring office with accurate intelligence at anytime during a day about the amount of coins deposited in each phone or vending machine of a system. Our invention is very efficient in that it enables a person in a central office to schedule coin pickup from phones and machines that are substantially full while bypassing those that are not. This optimizing of coin pickup results in a reduction of labor and hence an increase in profits. Further optimum collections will also eliminate full coin receptacles which often cause the machines to stop functioning resulting in a loss of revenue. In addition, the surveillance apparatus enables one to know exactly how much money was in a particular coin box when it was opened and how many times it was opened.

The surveillance apparatus comprises two basic units, a monitoring unit and a receiving unit. The monitoring unit keeps track of all net deposits made into the machine; coins that are returned are not stored within the monitoring unit. The receiving unit is located in a central office having means to signal each machine in a system for a readout of the information stored in its registers. If the information indicates the coin box is substantially full, a collection of that box will be scheduled.

The monitoring unit has three sets of coin counting registers capable of accumulating counts for quarters, dimes and nickels. The registers are large enough to handle the maximum number of coins that could fill the receptacle.

The receiving unit may transfer data to a small or medium sized computer with a modest magnetic core capacity for calculating purposes. The computer would store information as to each phone or machine in the system. When the operator in the central location desires he can transmit a signal to a particular remotely positioned machine or phone and have the monitoring unit in said machine or phone transmit back the data from the machine or phone to the central location.

Accordingly, it is an object of this invention to provide a coin surveillance apparatus that will enable a person to determine the amount of coins in a vending machine or pay phone, said machine or phone being one of a large system.

Another object of this invention is to provide a coin surveillance apparatus that will enable one to optimize the collections from coin boxes or pay phones and vending machines.

Another object of this invention is to provide a coin surveillance apparatus that will enable a person at any time to transmit a signal to a particular unit of a system and have that unit transmit the amount of coins in its coin box.

Still another object of this invention is to provide a coin surveillance apparatus that will enable a person to know how many times a coin box of a particular unit of a system has been opened and how much money was in the coin box at the time.

BRIEF DESCRIPTION OF THE DRAWINGS

FIG. 1 is a block diagram illustrating the two basic units of the apparatus.

FIG. 2 is a schematic block diagram illustrating the applique unit of the apparatus.

FIG. 3 is a schematic block diagram illustrating the applique unit and the interrogating unit of the apparatus.

FIG. 4 is a sensor circuit diagram to determine the acceptance or rejection of a coin as embodied in the applique unit of the apparatus.

FIG. 5 is a circuit diagram for the sensing of nickels deposited into the coin box as embodied in the applique unit of the apparatus.

FIG. 6 is a circuit diagram for the sensing of dimes deposited into the coin box as embodied in the applique unit of the apparatus.

FIG. 7 is a circuit diagram for the sensing of quarters deposited into the coin box as embodied in the applique unit of the apparatus.

FIG. 8 is a circuit diagram for sensing the removal of the coin box as embodied in the applique unit of the apparatus.

FIG. 9 is a perspective view of a common pay phone.

DESCRIPTION OF PREFERRED EMBODIMENT

The preferred embodiment illustrated in drawings 1 through 9 as described herein is not intended to be exhaustive or to limit the invention to the precise form disclosed. It is chosen and described in order to best explain the principles of the invention and its application and practical use to thereby enable others skilled in the art to best utilize the invention.

The coin surveillance apparatus 10 is comprised of a plurality of monitoring or applique units 12 and an interrogating or polling and/or receiving unit 14 having display or readout capabilities. The plurality of monitoring units 12 are electrically coupled to the receiving unit 14 as will be described hereinafter. The data received from each of the plurality of monitoring units 12 can be transmitted directly to a central processing unit, not illustrated, such as a computer having the capability of storing the data received from each monitoring unit 12.

The coin surveillance apparatus embodied by our invention is applicable for monitoring the amount of coins deposited in pay phones, vending machines and any other machine for which it is desirable to monitor the amount of coins deposited. To simplify the description we will describe the invention as it applies to a pay phone 15. However, it is understood that our invention can be applied to any device or apparatus for which it is desirable to monitor the accumulation of coins therein, without deviating from the spirit and scope of the invention.

The pay phone 15 is one that is well known in the art having a receiver 102 positioned or cradled on a hook 104 and a coin box 106. Slots 108a, 108b, and 108c are suitable for receiving nickels, dimes and quarters respectively.

The applique unit 12, as illustrated in FIG. 2, is comprised of an interface circuit system 16, a register bank 18 and a control logic circuit system 20. The interface subsystem 16 of the applique unit 12 monitors transmitting and receiving lines 22, 24 respectively; the three coin leads 26, 28, 30 respectively representing quarters, dimes and nickels; the coin box switch 70 via line 32 and the ground lead 34. The interface system 16 performs any required level shifting and filtering, by circuits well known in the art, prior to furnishing the control logic system 20 with off hook; collect; refund; and trigger signals along signal leads 36, 38, 40, and 42 respectively. The direction of the arrows on the aforesaid signal leads indicate the flow of signals from one subsystem to another of the applique unit 12. For example, if the receiver 102 of the pay phone 15 were off its hook 104, a signal is transmitted via lead 36 from the interface system 16 to the control logic system 20. Likewise, if coins were either collected or refunded, depending whether a phone call was completed, this information would be received by the control logic system 20 via lines 38 and 40 respectively. The control logic system 20 governs the operation of the interface system and the register bank 18.

FIG. 3 more fully illustrates each subsystem of the applique unit 12. In terms of the system's data taking role, the depositing of coins into slots 108a, 108b and 108c of a pay phone 15 causes signals to be generated on signal leads 26, 28, 30 to a level converter well known in the art. The level converter 43 does any shifting or filtering of the signals received by means of circuitry well known in the art. These signals are transmitted from the level converter 43 via leads 44, 46, 48 respectively to the register bank 18 and the temporary holding registers 50, 52, 54 for nickels, dimes and quarters respectively. These signals are counted and stored in said temporary holding registers. Subsequent to the signals being stored in the aforesaid temporary holding registers a determination must be made if the coins were collected or refunded. If the money is refunded, because the phone call was not completed, the contents of the holding registers are erased. If the phone call is completed, the money is collected into the coin box 106 of the phone 15, the contents of the temporary holding registers are then added to the corresponding storage registers 56, 58, 60 for nickels, dimes and quarters respectively via signal leads 110, 112 and 114. In addition to the registering of the collected coins in storage registers 56, 58 and 60 a signal is generated along line 62 or 64 to register 66 or 68 respectively. Register 66 monitors recognizable local calls "LC" while register 68 monitors recognizable calls "C". The signals along lines 62 and 64 are generated from the control logic system 20 to the registers 66 or 68. The operating telephone company will define what is recognizable local call and a recognizable call. Upon the coins being collected, i.e., deposited into coin box 106, either register 66 or 68 is increased by one increment.

When the coin box 106 is removed from the telephone 15, the coin box switch 70 is activated generating a signal from the control logic system 20 to a coin box register 72 and a coin box-time out register 74 via lines 76 and 78 respectively. Each time the coin box 106 is removed the coin box register 72 is incremented by one. The coin box-time out register 74 is incremented by one for each period of time the box 106 is removed from the phone enabling one to determine the period of time the phone was removed from the box. This time period may vary from a few seconds to minutes depending upon the particular telephone company's desire. Whatever the time period, the register operates the same.

A series of permanent storage registers 80, 82 and 84 are respectively coupled to the nickel storage register 56, dime storage register 58 and quarter storage register 60 via leads 86, 88 and 90. Each time the coin box switch 70 is activated it causes the control logic system 20 via signal lead 92 to add the contends of the storage registers 56, 58, 60 to the corresponding permanent registers 80, 82, 84 and then erase the contents of the storage registers 56, 58, 60; said signal line being coupled between the control circuit system 20 and the permanent storage registers 80, 82 and 84. The permanent registers then contain a running total of all money collected in the particular phone.

In my preferred embodiment the temporary holding registers for nickels, dimes and quarters, 50, 52, 54 respectively are each capable of storing 256 counts; the three storage registers 56, 58, 60 each capable of storing 4,096 counts; and the three permanent storage registers each capable of storing 65,536 counts. The coin box register 72 can store 256 counts while the coin box-time out register 74 can store 65,536 units of a preset time period. If the time period were six seconds, the register could store approximately four days of time out. The registers 66, 68 for recognizable local calls and recognizable calls each can store 4,096 counts.

The aforesaid registers are well known devices in the art and are readily available. It is possible to use registers having different count or unit capacities than set forth herein without deviating from the spirit and scope of this invention.

The receiving and display unit 14 is located in the operating telephone company's office. Upon entry of a number or code, the receiving unit 14 will be able to dial the number of the remote phone to be interrogated by means of either touch tone or dial pulse signals. However, the interrogation tone will be transmitted only if the pay phone is found to be in the on-hook condition; i.e., not being used. The receiving signal from the interrogating unit 14 is received by the interface system 16 via line 24 and by means of trigger line 42 conveys said signal to the control logic system 20. If the control logic system 20 determines the phone is on-hook, by means of circuitry well known in the art, a signal is transmitted via line 94 from said logic system 20 to the interface system 16 enabling the data in the storage registers 56, 58 and 60 to be transmitted from the register bank 18 to the interface system 16 via transmitting line 96 and to the interrogating unit 14 via transmitting line 22. The interface system 16 has a data receiver 98 and a data transmitter 100 suitable for receiving the interrogating signal and transmitting the information from the registers 56, 58, 60, 66, 68, 72, 74, 80, 82 and 84 of the register bank to the interrogating unit 14. The data receiver 98 and data transmitter 100 are well known devices in the art and are readily available in the market; the size and type used being determined by the signal received and the type, quantity and quality of information to be transmitted back to the receiving unit 14.

The transmitting signal line 96 is connected to each of the holding registers 50, 52, 54; to each of the storage registers 56, 58, 60; to each of the permanent registers 80, 82, 84 and to the registers 66, 68, 72 and 74, thereby enabling the data contained in these registers to be transmitted from the data transmitter 100 to the interrogating unit 14 upon receipt of a signal received from the data receiver 98. The signal for information is generated at the interrogating unit 14 and is transmitted via line 24 to the data receiver 98 and to the control logic subsystem 20 via line 116. The requested data may be for a reading of all registers or of certain registers. The control logic circuitry for requesting data from specific registers is well known in the art and is therefore not illustrated. A signal may also be generated from the data receiver 14 to the control logic system 20 via the data receiver 98 and lines 24 and 116 respectively to erase the holding registers 50, 52, 54; to erase the storage registers 56, 58, 60 or to store the existing data in the storage registers 56, 58, 60 via signal lines from the control logic system 20 to said registers via lines 118, 120, 122 respectively.

The control or logic circuitry of the control logic system 20 is logic circuitry well known in the art for enabling information located at a remote point, (telephone booth), to be transmitted, upon receipt of the appropriate signal, to a designated point such as the office of the operating phone company. The direction of the arrows on all lead wires designates the direction of the signal being transmitted.

FIG. 4 illustrates a sensor circuit 124 for determining whether or not a coin has been accepted, the phone call completed, or has been rejected, the phone call not being completed. There is a circuit for nickels, dimes and quarters. The accept voltage for this circuit is a plus 100 volts while the reject voltage is a negative 100 volts. The circuit comprises a flip flop circuit 126, well known in the art, coupled to amplifiers 128$a$ and 128$b$ and inverter amplifiers 130$a$ and 130$b$. The inverter amplifier 130$a$ is coupled to resistors $R_1$, $R_2$, a capacitor $C_1$, and diodes $D_1$, and $D_2$. Inverter amplifier 130$b$ is coupled to an R-C circuit having resistors $R_3$, $R_4$, capacitor $C_2$ and diodes $D_3$ and $D_4$. The values given are approximate values to achieve an accept voltage of plus 100 v and a reject voltage of a minus 100 volts. There are many types of circuits known in the art that can achieve an accept or reject condition, any of which could be used without deviating from the spirit and scope of the invention. The accept or reject voltage of a plus or minus 100 volts respectively can be varied without departing from the spirit and scope of the invention.

FIGS. 5, 6, and 7 are the nickel, dime and quarter sensor circuits respectively. In FIG. 5, the nickel slot is connected to a flip flop circuit M3 by means of inverter amplifier A, and amplifier $A_2$. A flip flop circuit I4 is coupled directly to flip flop circuit M3 and to a NAND gate 132 which in turn is coupled to an amplifier A3 and a second flip flot circuit I4.

In FIG. 6 the dime slot is coupled to flip flop circuit H2 by means of the inverter amplifier $A_1$ and amplifier $A_2$. The flip flop circuit H2 is coupled to flip flop circuit J3 and to a NAND gate 134 which in turn is coupled to amplifier $A_3$ and a second flip flop J3.

In FIG. 7 the quarter slot is coupled to a flip flop circuit M3 by means of inverter amplifier $A_1$ and amplifier $A_2$. The flip flop circuit M3 is coupled to flip flot circuit J4 and NAND gate 136 which in turn is coupled to amplifier $A_3$ and a second flip flop circuit J4.

The output of each of these sensor circuits feeds a signal by means of logic circuitry well known in the art to the respective holding registers which in turn is transferred to the respective storage registers if the coin is accepted; a negative signal indicates the coin was not accepted and erased from the holding registers 50, 52, 54.

FIG. 8 illustrates the sensor circuit for the box switch 70. This circuit enables a signal to be transmitted to registers 72 and 74 each time the coin box 106 is opened; register 74 records a unit for each period of time the box 106 is out. The circuit is comprises of a switch 70 attached to the coin box and electrically coupled to an amplifier $A_1$, and an RC circuit having resistor $R_1$ and capacitor $C_1$ which in turn is coupled to an inverter amplifier $A_2$ and to a flip flop circuit C4. A flip flop C4 is coupled to the first flip flop C4 and to a plurality of AND, NAND and OR gates.

The nickel, dime and quarter sensor circuits send a signal to their respective temporary holding registers 50, 52, 54.

The output signal of each of the nickel, dime and quarter circuits illustrated in FIGS. 5, 6, and 7 is transmitted to holding registers 50, 52 and 54 respectively via leads 44, 46 and 48. The data is held in said holding registers until the accept/reject circuit within the control logic subsystem 20 sends a signal to erase the data or to transfer it to the permanent registers 56, 58, 60 depending whether the phone call was completed or not.

In operation the coin surveillance apparatus enables an operating phone company to monitor the coins deposited into a coin box 106 of a telephone 15 located in an area remote from said operating company. Each remote pay phone has coupled to it an applique or monitoring unit 12. The coin slots 108a, 108b and 108c are coupled to the interface subsystem 16 via leads 26, 28 and 30. The applique unit 12 will continue to store, in the storage registers 56, 58, 60 a total of the number of nickels, dimes and quarters deposited into the coin box 106 since the last time the coin box was opened. If the phone call was not completed, the holding registers 50, 52, 54 are erased and no data is transferred to the storage registers 56, 58, 60. In addition, registers 66 and 68 are monitoring the number of local calls and completed calls respectively while registers 72 and 74 are monitoring the number of times the coin box 70 has been opened and the time period it has been out of said phone.

The operator at the central office can send a signal to any remote phone in the system at any time requesting certain data to be transmitted to the interrogating or polling and display unit 14. In order for the data to be transmitted back to the central office, the receiver must not be off its hook or cradle 104. If at any time during the transmission of data the receiver is picked off the hook 104, the data transmission will automatically cease. This is accomplished by means of logic circuitry well known in the art embodied in the applique unit 12. The transmission of data from the pay phone to the interrogating or polling and display unit 14 can be achieved by means well known in the art. The means we have chosen for transmission of data is a 1270 Hz carrier generated by a Motorola MC 6860 modem IC. The 1270 Hz carrier is buffered and transformer coupled to the telephone line by means well known in the art. The central office, by means of the interrogating unit 14 generates a 2225 Hz signal to the applique unit 12 and by using the same transformer that couples the 1270 Hz carrier to the telephone lines, and a diplexor, well known in the art, the 2225 Hz tone from the interrogating unit 14 can be received by the applique unit 12. The 2225 Hz is band pass filtered, by means well known in the art, and fed to a Motorola MC 6860 modem IC via limiters. If the 2225 Hz signal meets pre-set requirements (such as receiver is in on-hook position), the MC 6860 modem IC gives the signal to transmitt data from the applique unit 12 to the interrogating unit 14 via transmitter 100.

The applique has three serial memories, namely, the holding registers 50, 52, 54, the storage registers 56, 58, 60 and the permanent storage registers 80, 82, 84. Each of the aforesaid registers has a capacity for 16 bit binary words, thereby providing a capacity for each of over 65,000 counts. The aforesaid memories are kept running by a 10 micro-second clock. The formating of each memory into a word position, is accomplished by means of a counter and decoder, well known in the art, which is always stepped with the same 10 micro-second clock.

When the 2225 Hz from the central office is received by the applique unit 12, the 10 micro-second clock rate is stopped. The memory of said registers including the coin box time out and coin box registers 74, 72 is then stepped at a 40 msec. clock rate. Each bit position of memory is then 40 msec. in duration. The 40 msec period is divided into an 8 msec "break" leader and two 16 msec time slots. The second 16 msec. slot is set high for a logic "0" bit in memory. Both 16 msec. slots are set high for a logic "1" in memory. As a result, each bit in the stream is 40 msec. long with a 8 msec. "break" followed by a 16 msec. "break" or "make" followed by a 16 msec. "make." At the central office, the interrogating or polling and display unit 14, the serial bit stream will be synchronized on each 8 msec. "break" and sampled in the center of the 40 msec. bit period to determine if a logic "1" or "0" was transmitted from the applique unit 12.

In our preferred embodiment when the coin box 106 is removed from the phone 15 and then reinserted, the accumulator memory coin counts of registers 56, 58, 60 are added to the coin counts that are present in the permanent registers 80, 82, 84. When any of said permanent registers go beyond 65,536 counts, they start over from zero. There is no erase or "clear" provided for these permanent registers. However, when the storage memory registers 56, 58, 60 counts are added to the permanent registers 80, 82, 84 said storage registers counts for coins is zeroed.

It is believed that the invention has been described in such detail as to enable those skilled in the art to understand the same and it will be appreciated that variations may be made without departing from the spirit and scope of the invention.

We claim:

1. A coin surveillance apparatus that monitors the amount of coins deposited into a plurality of remote coin receiving machines, each said machine having a coin box, and transmits data from said plurality of remotely positioned machines to a central office, wherein said coin surveillance apparatus is operative when said machines are in either a pre-pay or post-pay mode, said apparatus comprising:
   a plurality of monitoring units, each having a nonvolatile memory and located with and coupled directly to each of said plurality of machines, respectively, each said unit having a unique number identification stored therein;
   a polling and display unit positioned in said central office, said polling and display unit having means to interrogate each of said plurality of monitoring units to cause said data and said number identification to be transmitted from said monitoring units to the polling and display unit;
   whereas, each monitoring unit has a register bank containing a plurality of nickel, dime and quarter registers, a receptacle collection counter and a receptacle time-out second counter; the plurality of registers storing the current revenue deposited subsequent to the last collection; and the receptacle time-out counter storing the time the coin box is removed from the apparatus.

2. A coin surveillance apparatus as defined in claim 1 wherein each said monitoring unit also comprises:
   an interface circuit remotely coupled to the polling and display unit;
   a register bank electrically coupled to the interface circuit; and
   a control logic circuit system electrically coupled to the interface circuit and the bank of registers.

3. A coin surveillance apparatus as defined in claim 2 wherein the register bank comprises three holding registers, one for registering the number of nickels deposited into the machine, a second for registering the number of dimes deposited into the machine and the third for registering the number of quarters deposited into the machines, wherein each of said holding registers is electrically coupled to the interface circuit and the control logic circuit system.

4. A coin surveillance apparatus as defined in claim 3 wherein the register bank comprises three storage registers, one each for registering the number of nickels, dimes and quarters deposited into the coin machine, said storage registers being electrically coupled to similar coin designations of the three holding registers wherein when a nickel, dime and quarter are deposited into the coin machine and are not returned, said coins are registered in the nickel, dime and quarter storage registers.

5. A coin surveillance apparatus as defined in claim 4 wherein the three storage registers for nickels, dimes and quarters are electrically coupled to the control logic circuitry.

6. A coin surveillance apparatus as defined in claim 5 wherein said register bank further comprises three permanent storage registers, one each for registering nickels, dimes and quarters, said permanent storage registers being electrically coupled to the similar coin designations of the three storage registers and to the control logic circuitry.

7. A coin surveillance apparatus as defined in claim 6 wherein said receptacle collection counter counts the number of times the coin box of the coin machine is removed from the machine wherein said counter is electrically coupled to the control logic circuit and the interface circuit.

8. A coin surveillance apparatus as defined in claim 7 wherein said receptacle time-out second counter records the time said coin box is removed from the coin machine, said receptacle time out second counter being electrically coupled to the control logic circuit and the interface circuit.

9. A coin surveillance apparatus as defined in claim 8 wherein said interface circuit further comprises:
a data receiver electrically coupled to the polling and display unit and to the control logic circuit.

10. A coin surveillance apparatus as defined in claim 9 wherein said interface circuit further comprises:
a data transmitter electrically coupled to the polling and display unit and to the registers of the register bank, wherein data is transmitted from said registers to the polling and display unit by means of said transmitter.

11. A coin surveillance apparatus as defined in claim 10 wherein said interface circuit further comprises:
a level converter electrically coupled to the holding registers of the register bank and to the control logic circuit.

12. A coin surveillance apparatus as defined in claim 11 wherein each said machine is a pay phone having a coin slot for nickels, dimes and quarters, a coin box and a receiver positioned on a hook for holding same.

13. A coin surveillance apparatus as defined in claim 12; said control circuit comprising a coin accept—coin reject circuit for nickels, dimes and quarters, said accept-reject circuit being electrically coupled respectively to the nickel, dime and quarter coin slots of the pay phone.

14. A coin surveillance apparatus as defined in claim 13, said interface circuit further comprising a nickel sensor circuit electrically coupled to the nickel coin accept-reject circuit and the nickel holding register of the register bank wherein a deposit of a nickel coin is erased from the nickel holding register when a reject voltage is generated and is transferred from the nickel holding register to the nickel storage register when an accept voltage is generated.

15. A coin surveillance apparatus as defined in claim 14, said interface circuit further comprising a dime sensor circuit electrically coupled to the dime coin accept-reject circuit and the dime holding register of the register bank wherein a deposit of a dime coin is erased from the dime holding register when a reject voltage is generated and is transferred from the dime holding register to the dime storage register when an accept voltage is generated.

16. A coin surveillance apparatus as defined in claim 15, said control circuit further comprising a quarter sensor circuit electrically coupled to the quarter coin accept-reject circuit and the quarter holding register of the register bank wherein a deposit of a quarter coin is erased from the quarter holding register when a reject voltage is generated and is transferred from the quarter holding register to the quarter storage register when an accept voltage is generated.

17. A coin surveillance apparatus as defined in claim 16 wherein the coin box of the pay phone has a switch electrically coupled to the coin box register and the coin box time out registers positioned in the register bank wherein each time the coin box is removed from the pay phone the coin box register increases by one and for each predetermined period of time said coin box is removed the time out register is increased by one.

* * * * *